United States Patent
Katrak et al.

(10) Patent No.: US 7,082,925 B2
(45) Date of Patent: Aug. 1, 2006

(54) ELECTRONIC THROTTLE CONTROL WITH THROTTLE POSITION SENSOR SYSTEM AND AIR FLOW INDICATORS

(75) Inventors: Kerfegar K. Katrak, Fenton, MI (US); John N. Stockbridge, Novi, MI (US); Mark H. Costin, Bloomfield Township, MI (US); Robert J. Schaller, Brighton, MI (US); Timothy J. Hartrey, Brighton, MI (US); James L. Worthing, Munith, MI (US); Paul A. Bauerle, Fenton, MI (US); Bruce A. Rogers, Novi, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 11/060,950

(22) Filed: Feb. 18, 2005

(65) Prior Publication Data

US 2005/0235955 A1  Oct. 27, 2005

Related U.S. Application Data

(60) Provisional application No. 60/565,697, filed on Apr. 26, 2004.

(51) Int. Cl.
*F02D 41/22* (2006.01)
*G01M 19/00* (2006.01)

(52) U.S. Cl. ..................... 123/396; 123/399
(58) Field of Classification Search ............... 123/361, 123/396, 399; 73/118.1, 118.2; 701/103, 701/107

See application file for complete search history.

(56) References Cited

U.S. PATENT DOCUMENTS

| | | | | |
|---|---|---|---|---|
| 5,654,888 A * | 8/1997 | Muller et al. | ................... | 701/54 |
| 5,999,875 A * | 12/1999 | Bruedigam et al. | ......... | 701/110 |
| 6,199,535 B1 * | 3/2001 | Hara | ........................... | 123/396 |
| 6,209,518 B1 * | 4/2001 | Machida et al. | ............ | 123/396 |
| 6,273,061 B1 * | 8/2001 | Hosoi | ......................... | 123/333 |
| 6,279,534 B1 * | 8/2001 | Schreurs et al. | ............ | 123/396 |
| 6,390,064 B1 * | 5/2002 | Marumoto et al. | ......... | 123/399 |
| 6,647,959 B1 * | 11/2003 | Noguchi | ..................... | 123/396 |
| 6,668,795 B1 * | 12/2003 | Shimada | ..................... | 123/350 |
| 6,701,282 B1 * | 3/2004 | Ting et al. | ................... | 702/185 |
| 6,799,110 B1 * | 9/2004 | Hashimoto et al. | ........... | 701/62 |
| 6,805,094 B1 * | 10/2004 | Hashimoto et al. | ......... | 123/396 |
| 2005/0024223 A1 * | 2/2005 | Katrak et al. | ............ | 340/686.1 |

* cited by examiner

*Primary Examiner*—Hai Huynh
(74) *Attorney, Agent, or Firm*—Christopher DeVries

(57) ABSTRACT

Apparatus are provided for an electronic throttle control (ETC) system having a throttle body assembly. The apparatus includes a throttle actuator, an input circuit receiving sensor signals and having first, second, and third reference voltages, a first throttle position sensor (TPS) connected to the second reference voltage, a second TPS connected to the second reference voltage, a manifold absolute pressure (MAP) sensor connected to the first reference voltage, a manifold airflow (MAF) sensor connected to the third reference voltage, and a processor connected to the input circuit and transmitting a control signal to the throttle actuator based on the sensors, reference voltages, and returns. The ETC system has improved remedial actions responsive to failures of the various sensors, reference voltages, and returns.

30 Claims, 2 Drawing Sheets

ELECTRONIC THROTTLE CONTROL WITH THROTTLE POSITION SENSOR SYSTEM AND AIR FLOW INDICATORS

CROSS-REFERENCES TO RELATED APPLICATIONS

This application claims the benefit of U.S. Provisional Application No. 60/565,697, filed Apr. 26, 2004.

FIELD OF THE INVENTION

The present invention generally relates to motor vehicle powertrain control, and more particularly relates to electronic throttle control.

BACKGROUND OF THE INVENTION

Accelerating a vehicle, decelerating the vehicle, or maintaining vehicle speed (i.e., neither accelerate nor decelerate the vehicle) are each generally accomplished through driver interaction with an accelerator pedal in a motor vehicle. In internal combustion engines, a vehicle drive train typically includes an engine coupled to a multiple-speed ratio transmission which in turn is coupled via a drive shaft and differential to a pair of driven wheels. The position of a throttle placed within an intake manifold of the engine is controlled to produce power for driving the wheels. The throttle is positioned by an electric motor under the control of an engine or powertrain control module (PCM) which also controls the operation of the engine and transmission. Additionally, the PCM controls conventional spark and fuel control devices that may be coupled to engine. The PCM typically operates based on a number of inputs including engine speed, vehicle speed, accelerator pedal position, and throttle position. These inputs are provided by various conventional sensors such as shaft speed sensors and throttle position sensors.

In general, the PCM activates the electric motor to position the throttle according to a desired throttle area determined in response to accelerator pedal position and various control functions, such as idle speed control, engine governor control, cruise control, and traction control. For example, a depression of the accelerator pedal results in a corresponding movement of a throttle valve by the electric motor that controls the opening and closing of the throttle valve. The degree of depression results in a movement of the throttle plate through a corresponding angle. These functions may be implemented using an electronic throttle control (ETC) which uses a simple pedal position to throttle position comparison based on pedal position sensors (PPSs) and throttle position sensors (TPSs), respectively. Typically, such control includes adjusting throttle valve position by controlled motor motion to provide appropriate restriction to an air passage into the engine. When the accelerator pedal is depressed by the driver, the angle of the throttle valve is increased by the throttle actuator. This allows more air into the engine and generally increases engine power.

The PCM may be responsive to any one of several factors used to formulate a current desired throttle position. For example, such factors may include inputs indicative of the engine operating conditions, an operator command from an accelerator pedal, or information from an active cruise control algorithm. Feedback may be provided to the PCM from a conventional throttle valve position sensor communicating a signal to the controller, the magnitude of which is related to the degree of opening of the throttle valve or plate.

In the past, ETC systems using throttle position sensors (TPSs), typically two TPSs, have generally relied upon a single reference and return for each TPS. For example, a 5 Volt reference, 5VA, is used as a reference and return for both TPS1 and PPS2, and a 5 Volt reference, 5VB, is used as a reference and return for both TPS2 and PPS1. In this example, a manifold absolute pressure (MAP) sensor had the same reference and return as the TPS2 sensor, namely the MAP sensor also used 5VB as a reference and return with TPS2.

One concern with ETC systems is failure mode response to account for safety considerations of vehicle operation. In the previous example, a loss of 5VA reference or return (or ground) results in a malfunction indicator lamp (MIL) activation and limited throttle authority (LTA) whereby the throttle can only be displaced to a limited degree, a loss of 5VB reference or return results in MIL activation and engine shutdown whereby fuel is shut-off, and a loss of MAP results in MIL activation and default throttle authority (DTA), also referred to as limp-home mode, whereby the throttle is parked. Additionally, conventional ETC systems have generally used a MAP sensor for sensing air pressure and deriving airflow when providing remedial actions. However, the automotive industry continually demands improvements to existing remedial actions of ETC to provide continued safety improvements while minimizing, maintaining, or decreasing overall cost of incorporating such improvements.

Accordingly, it is desirable to provide a throttle position sensor up-integrated electronic throttle control system having improved failure mode response. In addition, it is desirable to provide an electronic throttle control system using a mass airflow sensor and a manifold absolute pressure sensor that has improved failure mode response. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

According to various exemplary embodiments, an apparatus is provided for electronic throttle control using a throttle body assembly having: a throttle actuator; an input circuit receiving sensor signals and having a first reference voltage, a second reference voltage, and a third reference voltage; a first throttle position sensor (TPS) connected to the second reference voltage; a second TPS connected to the second reference voltage; a manifold absolute pressure (MAP) sensor connected to the first reference voltage; a manifold airflow (MAF) sensor connected to the third reference voltage; and, a processor connected to the input circuit and transmitting a control signal to the throttle actuator based on the sensor signals. The ETC system having the aforementioned throttle body assembly has improved remedial actions responsive to failures of the various sensors, references, and returns. Additionally, the ETC system uses a combination of MAP and MAF sensors for improving remedial actions in one embodiment.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention, brief description of the drawings, or the following detailed description.

Among other components, an engine assembly includes an engine, an air intake manifold, and a throttle actuator. Air flows into the engine through the air intake manifold which is controlled by the throttle actuator. The air is combined into fuel-air mixtures, combusted in engine cylinders, and released through an exhaustion system. The throttle valve is controlled by an accelerator pedal, either directly with a cable or indirectly in a "drive-by-wire" configuration. Pedal position sensors (PPSs) monitor the position of the accelerator pedal, and throttle position sensors (TPSs) monitor the position of the throttle valve. The assembly also includes a mass air flow (MAF) sensor positioned at the air intake manifold for measuring airflow into the engine, and intake manifold air pressure is sensed by a manifold absolute pressure (MAP) sensor.

According to various embodiments, an electronic throttle control (ETC) system for use with a throttle body assembly is provided having improved failure mode response. The ETC system has a unique throttle position sensor architecture based on an arrangement of TPSs, a MAP sensor, and a MAF sensor to output an appropriate control signal to a throttle actuator. Depending on a first order failure and a second order failure corresponding to the aforementioned sensors, the ETC system has desirable ETC safety compliance with robust failure mode responses. Additionally, the ETC system does not have engine shutdown as a first order failure response or a second order failure response to the aforementioned sensors. Although the ETC system is described hereinbelow with reference to TPSs, the MAP sensor, the MAF sensor, reference voltages and returns (or grounds), additional sensors may be used with the throttle body assembly.

Figure 1:
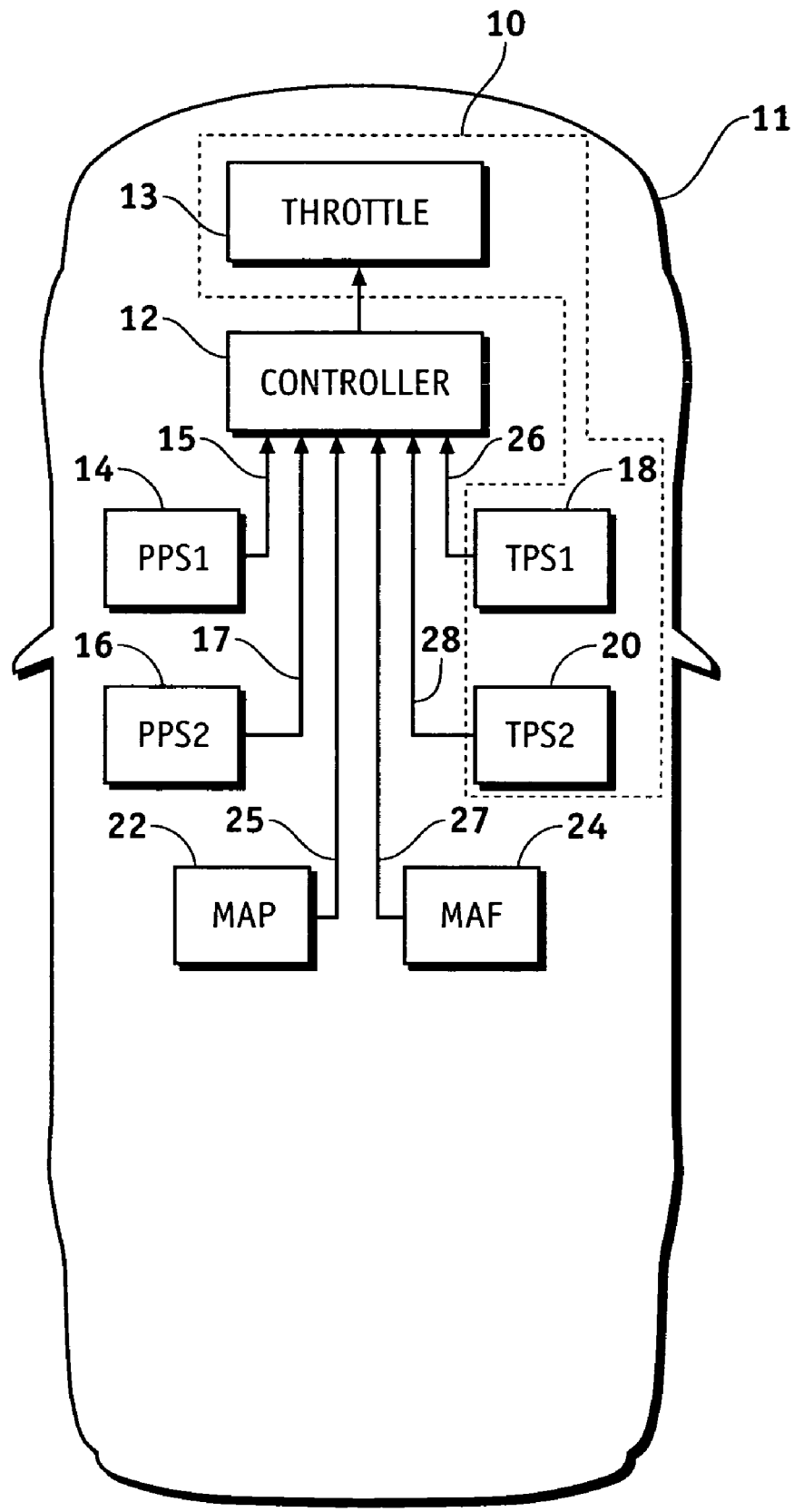
FIG. 1 is a schematic diagram of an exemplary embodiment of a throttle body assembly.

Referring now to the drawings, FIG. 1 is a schematic diagram of an exemplary embodiment of a throttle body assembly, shown generally at 10, in a motor vehicle 11. The throttle body assembly 10 includes a controller 12 that receives signals from PPSs 14, 16, TPSs 18, 20, a MAP sensor 22, and a MAF sensor 24. The controller 12 outputs a control signal to the throttle actuator 13 in response to the signals received from the PPSs 14, 16, TPSs 18, 20, MAP sensor 22, and MAF sensor 24.

The controller 12 is a conventional digital computer used for engine control, and includes standard elements of a central processing unit (CPU), random access memory, read-only memory, analog to digital converter(s), input/output circuitry, and clock circuitry. The controller 12 may be activated upon application of ignition power to the engine. When activated, the controller 12 performs a series of operations stored in an instruction-by-instruction format in memory for providing engine control, diagnostic and maintenance operations.

In one embodiment, the controller 12 may be a microcontroller that executes an engine control program with engine control functions. The control program is stored in a read-only memory (ROM) or other permanent memory device, and random access memory (RAM) is used for temporary storage of program variables, parameter measurements and other data. Standard interface units are provided with the controller 12 for translating signals from the previously mentioned sensors into signals usable by controller 12 and serve as inputs to the controller 12. Using these inputs, the controller 12 performs appropriate computations and outputs various signals. For example, the controller 12 uses TPS1 18 and TPS2 20 in an electronic throttle control program to produce the control signal, such as an ETC signal, to control the throttle actuator. When the accelerator pedal is displaced, the ETC signal directs the throttle actuator to increase the angle of the throttle, allowing more air into the engine and thereby increasing engine power.

In one embodiment, a set of engine parameters, including input from TPS1 18, TPS2 20, the MAP sensor 22, and the MAF sensor 24, are measured or estimated by the controller 12. The throttle position is measured by TPS1 18 and TPS2 20 and input to the controller 12 through a pair of lines 26, 28, respectively. The accelerator pedal position is measured by PPS1 14 and PPS2 16 and input to the controller 12 through a pair of lines 15, 17, respectively. The manifold pressure is sensed by the MAP sensor 22 and the manifold airflow is sensed by the MAF sensor 24, and both are input into the control unit 12 through a pair of lines 25, 27, respectively. In one embodiment, the sensors mentioned above are all standard sensors, a variety of which are readily available to those skilled in the art.

Figure 2:
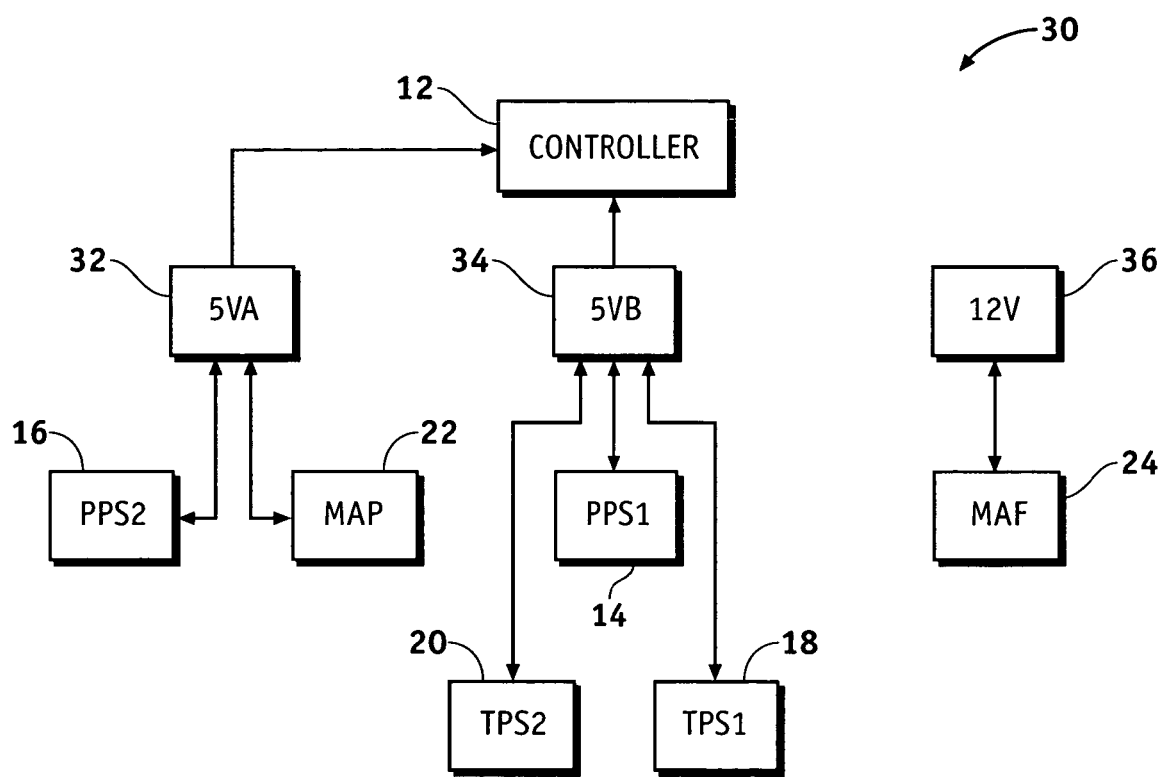
FIG. 2 is a schematic diagram of an exemplary embodiment of a throttle position sensor architecture in an electronic throttle control system.

FIG. 2 is a block diagram of an exemplary embodiment of a throttle position sensor architecture, shown generally at 30, in an ETC system. Reference voltages, 5VA 32, 5VB 34, and 12V 36, are connected to various sensors and input signals to the controller 12. Although 5 Volts and 12 Volts are described herein in connection with the reference voltages, these values are listed merely for convenience of explanation and other voltage values may be used, such as based on conventional battery voltage. 5VA reference voltage 32 is connected to the MAP sensor 22 and PPS2 16. 5VB reference voltage 34 is connected to TPS1 18, TPS2 20, and PPS1 14. 12V reference voltage 36 is connected to the MAF sensor 24. In this embodiment, TPS1 18 and TPS2 20 are both connected to the same reference voltage, 5VB.

Tables 1 through 9, described in greater detail hereinafter, show failure mode responses, or remedial actions, of the controller 12 based on first order failures and second order failures of specific sensors, references, and returns used in the ETC system. Limited throttle authority (LTA) corresponds to limited throttle displacement. Engine shutdown corresponds to fuel shut-off to the engine. Default throttle authority (DTA) corresponds to parked throttle, or powered-off throttle. The failures, first order or second order, of the MAP are based upon failure of the MAP sensor alone or as a performance fault of the MAP sensor compared with a TPS. The failures, first order or second order, of the MAF sensor are based upon failure of the MAF sensor alone or as a performance fault of the MAF sensor compared with a TPS.

Inputs from TPS1 18 and TPS2 20 are compared with one another by the controller 12 to determine TPS correlation error (TPS Corr). In the event that the signal from TPS1 18 is not the same as the signal from TPS2 20, the controller 12 selects the higher of the two throttle positions and proceeds to LTA. The controller 12 also determines whether the TPSs 18, 20 are shorted to one another and proceeds to DTA in the event of a short.

Inputs from PPS1 14 and PPS2 16 may also be compared with one another by the controller 12 to determine a PPS correlation error, and the controller 12 may also determine whether the PPSs 14, 16 are shorted. For purposes of illustrating the effect of the invented TPS architecture on remedial actions of the controller, the remedial actions responsive to PPS failure, either PPS1 or PPS2, PPS Correlation error, and shorts of either PPSs are not included in the following Tables and are not critical to the operation of the invented ETC system. Additionally, although not listed in the following tables, any remedial action may also result in activation of a reduced engine power (REP) light. Furthermore, a MIL may be activated for on-board emission requirements.

Table 1 shows core remedial actions of the controller 12 in one embodiment. A first failure of either TPS1 or TPS2 results in limited throttle displacement. A first failure of either the MAP sensor or the MAF sensor does not result in a throttle change but only activation of a MIL light. In the event of failure of the MAP sensor, a defaulted value may be used, and in the event of failure of the MAF sensor, a modeled sensor may be used in lieu of the MAF sensor. Failure of the 5VA reference, or V5A, results in limited throttle displacement, and failure of the 5VB reference, or V5B, results in powered-off throttle. A TPS Correlation error results in limited throttle displacement, and a short of either TPSs results in powered-off throttle. In conventional TPS arrangements, failure of the MAP sensor results in powered-off throttle, or DTA, and failure of V5B results in engine shutdown.

TABLE 1

| 1st failure | Remedial action |
|---|---|
| TPS1 | LTA |
| TPS2 | LTA |
| MAP | None w/MIL |
| MAF | None w/MIL |
| V5A | LTA |
| V5B | DTA |
| TPS Corr | LTA |
| TPS Short | DTA |

Table 2 shows remedial actions of the controller 12 for first order failures of TPS1 18 and second order failures of various references, sensors, and returns in one embodiment. As previously mentioned hereinabove with respect to Table 1, the first failure of TPS1 results in limited throttle displacement, and the subsequent second failure of TPS2 results in powered-off throttle. A subsequent second failure of either the MAP sensor or the MAF sensor results in limited throttle displacement. A subsequent second failure of V5A results in limited throttle displacement, and a subsequent second failure of V5B results in powered-off throttle. A subsequent second failure corresponding to TPS Correlation error is not applicable since the TPS Correlation diagnostic is disabled during a TPS1 or TPS2 fault, while a subsequent second failure corresponding to a short of either TPSs results in powered-off throttle. In conventional TPS arrangements, the subsequent second failure of the MAP sensor results in engine shutdown, and the subsequent second failure of V5B also results in engine shutdown.

TABLE 2

| 1st failure | Remedial action | 2nd failure | Remedial Action |
|---|---|---|---|
| TPS1 | LTA | MAP | LTA |
| TPS1 | LTA | MAF | LTA |
| TPS1 | LTA | TPS2 | DTA |
| TPS1 | LTA | V5A | LTA |
| TPS1 | LTA | V5B | DTA |
| TPS1 | LTA | TPS Corr | N/A |
| TPS1 | LTA | TPS Short | DTA |

Table 3 shows remedial actions of the controller 12 for first order failures of TPS2 20 and second order failures of various references, sensors, and returns in one embodiment. As previously mentioned hereinabove with respect to Table 1, the first failure of TPS2 results in limited throttle displacement, and the subsequent second failure of TPS1 results in powered-off throttle. A subsequent second failure of either the MAP sensor or the MAF sensor results in limited throttle displacement. A subsequent second failure of V5B results in powered-off throttle. A subsequent second failure corresponding to TPS Correlation error is not applicable since the TPS Correlation diagnostic is disabled during a TPS1 or TPS2 fault, while a subsequent second failure corresponding to a short of either TPSs results in powered-off throttle. In conventional TPS arrangements, the subsequent second failure of the MAP sensor results in engine shutdown, and the subsequent second failure of V5B also results in engine shutdown.

TABLE 3

| 1st failure | Remedial action | 2nd failure | Remedial Action |
|---|---|---|---|
| TPS2 | LTA | MAP | LTA |
| TPS2 | LTA | MAF | LTA |
| TPS2 | LTA | TPS1 | DTA |
| TPS2 | LTA | V5A | LTA |
| TPS2 | LTA | V5B | DTA |
| TPS2 | LTA | TPS Corr | N/A |
| TPS2 | LTA | TPS Short | DTA |

Table 4 shows remedial actions of the controller 12 for first order failures of the MAP sensor 22 and second order failures of various references, sensors, and returns in one embodiment. A subsequent second failure of one of the MAF sensor or V5B results in powered-off throttle. A subsequent second failure of one of the TPSs or V5A results in limited throttle displacement. A subsequent second failure corresponding to TPS Correlation error results in limited throttle displacement, while a subsequent second failure corresponding to a short of either TPSs results in powered-off throttle. In conventional TPS arrangements, the subsequent second failure of the MAF sensor has no remedial action, the subsequent second failure of one of the TPSs or references V5A and V5B results in engine shutdown, the subsequent second failure corresponding to TPS Correlation error results in powered-off throttle, and the subsequent second failure corresponding to a short of either TPSs results in engine shutdown.

TABLE 4

| 1st failure | Remedial action | 2nd failure | Remedial Action |
|---|---|---|---|
| MAP | None w/MIL | MAF | DTA |
| MAP | None w/MIL | TPS1 | LTA |
| MAP | None w/MIL | TPS2 | LTA |
| MAP | None w/MIL | V5A | LTA |
| MAP | None w/MIL | V5B | DTA |
| MAP | None w/MIL | TPS Corr | LTA |
| MAP | None w/MIL | TPS Short | DTA |

Table 5 shows remedial actions of the controller 12 for first order failures of the MAF sensor 24 and second order failures of various references, sensors, and returns in one embodiment. A subsequent second failure of one of the MAP sensor or V5B results in powered-off throttle. A subsequent second failure of one of the TPSs results in limited throttle displacement. A subsequent second failure corresponding to TPS Correlation error results in limited throttle displacement, while a subsequent second failure corresponding to a short of either TPSs or failure of V5A results in powered-off throttle. In conventional TPS arrangements, the subsequent second failure of any of the aforementioned sensors, references, and returns has no additional remedial action, over that shown in Table 5 except failure of V5B results in engine shutdown.

TABLE 5

| 1st failure | Remedial action | 2nd failure | Remedial Action |
|---|---|---|---|
| MAF | None w/MIL | MAP | DTA |
| MAF | None w/MIL | TPS1 | LTA |
| MAF | None w/MIL | TPS2 | LTA |
| MAF | None w/MIL | V5A | DTA |
| MAF | None w/MIL | V5B | DTA |
| MAF | None w/MIL | TPS Corr | LTA |
| MAF | None w/MIL | TPS Short | DTA |

Table 6 shows remedial actions of the controller 12 for first order failures of reference voltage 5VA, or V5A, and second order failures of various references, sensors, and returns in one embodiment. A subsequent second failure of one of the MAP sensor, TPS2, or TPS1 results in limited throttle displacement. A subsequent second failure of the MAF sensor or V5B results in powered-off throttle. A subsequent second failure corresponding to either a TPS Correlation error or a short of either of the TPSs results in powered-off throttle. In conventional TPS arrangements, the subsequent second failure of the MAF sensor has no additional remedial action, and the subsequent second failure of V5B results in engine shutdown.

TABLE 6

| 1st failure | Remedial action | 2nd failure | Remedial Action |
|---|---|---|---|
| V5A | LTA | MAP | LTA |
| V5A | LTA | MAF | DTA |
| V5A | LTA | TPS2 | LTA |
| V5A | LTA | TPS1 | LTA |
| V5A | LTA | V5B | DTA |
| V5A | LTA | TPS Short | DTA |
| V5A | LTA | TPS Corr | DTA |

Table 7 shows remedial actions of the controller 12 for first order failures of reference voltage 5VB, or V5B, and second order failures of various references, sensors, and returns in one embodiment. A subsequent second failure of one of the MAP sensor, the MAF sensor, V5A, or the TPSs results in powered-off throttle. A subsequent second failure corresponding to a short of either of the TPSs results in powered-off throttle. In conventional TPS arrangements, the subsequent second failure of one of the aforementioned references, sensor, or return results in engine shutdown.

TABLE 7

| 1st failure | Remedial action | 2nd failure | Remedial Action |
|---|---|---|---|
| V5B | DTA | MAP | DTA |
| V5B | DTA | MAF | DTA |
| V5B | DTA | TPS2 | DTA |
| V5B | DTA | TPS1 | DTA |
| V5B | DTA | V5A | DTA |
| V5B | DTA | TPS Short | DTA |

Table 8 shows remedial actions of the controller 12 for first order failures of TPS Correlation error and second order failures of various references, sensors, and returns in one embodiment. A subsequent second failure of one of the MAP sensor, the MAF sensor, either TPSs, or V5A results in limited throttle displacement. A subsequent second failure of V5B results in powered-off throttle. A subsequent second failure corresponding to a short of either TPSs results in powered-off throttle. In conventional TPS arrangements, the subsequent second failure of the MAP sensor results in powered-off throttle or alternatively engine shutdown, the subsequent second failure of the MAF sensor has no additional remedial action, the subsequent second failure of V5B results in engine shutdown.

TABLE 8

| 1st failure | Remedial action | 2nd failure | Remedial Action |
|---|---|---|---|
| TPS Corr | LTA | MAP | LTA |
| TPS Corr | LTA | MAF | LTA |
| TPS Corr | LTA | TPS2 | LTA |
| TPS Corr | LTA | TPS1 | LTA |
| TPS Corr | LTA | V5A | LTA |
| TPS Corr | LTA | V5B | DTA |
| TPS Corr | LTA | TPS Short | DTA |

Table 9 shows remedial actions of the controller 12 for first order failures of TPS Short and second order failures of various references, sensors, and returns in one embodiment. A subsequent second failure of one of the MAP sensor, the MAF sensor, either TPSs, or the V5A reference results in powered-off throttle A subsequent second failure of V5B results in powered-off throttle, and a subsequent second failure corresponding to a Correlation error of either TPSs also results in powered-off throttle. In conventional TPS arrangements, the subsequent second failure of the MAP sensor results in parked throttle or alternatively engine shutdown, the subsequent second failure of the MAF sensor has no additional remedial action, and the subsequent second failure of V5B results in engine shutdown.

TABLE 9

| 1st failure | Remedial action | 2nd failure | Remedial Action |
|---|---|---|---|
| TPS Short | DTA | MAP | DTA |
| TPS Short | DTA | MAF | DTA |
| TPS Short | DTA | TPS2 | DTA |
| TPS Short | DTA | TPS1 | DTA |

TABLE 9-continued

| 1st failure | Remedial action | 2nd failure | Remedial Action |
|---|---|---|---|
| TPS Short | DTA | V5A | DTA |
| TPS Short | DTA | V5B | DTA |
| TPS Short | DTA | TPS Corr | DTA |

As illustrated in Tables 1 through 9, the invented throttle body assembly improves remedial action or failure mode responses compared with conventional TPS arrangements by using more desirable engine states. For example, no remedial action is more desirable than a remedial action, DTA is more desirable than engine shutdown, and LTA is more desirable than DTA. Additionally, from the foregoing Tables of failure mode responses, the ETC using the invented throttle body assembly does not have engine shutdown as a remedial action in response to the aforementioned sensors, references, and returns.

One criteria used for complying with ETC safety considerations is a probability of failure. Using a common reference voltage and return for both TPS1 and TPS2 and including the MAP sensor and the MAF sensor according to the aforementioned exemplary embodiments provides an ETC system that meets desired safety considerations. For example, a failure of one of V5A reference or V5A return or MAP sensor failure provides a first probability of occurrence, a failure of one of V5B reference or V5B return or TPS1 and TPS2 failure has a second probability of occurrence, and a MAF sensor failure has a third probability of occurrence. Because each of the aforementioned probability of occurrences is an independently occurring event, the overall probability of failure resulting from the combination of all three is well within the desired range for ETC safety consideration. The invented ETC system provides remedial actions or failure modes for all input/output failures of the system. Additionally, although remedial actions are described with respect to second order input/output failures, additional failures, such as third order or other input./output failures, may also occur and may optionally have corresponding remedial actions in various embodiments.

The overall cost of the throttle body is generally less expensive than conventional throttle bodies because fewer pins are used with the invented TPS architecture. In one embodiment, the number of pins used for signal communication is reduced from eight pins to six pins. For example, conventional throttle bodies use an eight-pin configuration with two pins designated for open and close, and each TPS out of two TPSs (i.e., TPS1 and TPS2) has a pin designated for a reference voltage, such as 5V, a pin designated for return, and a pin designated for signal. The throttle body using the invented TPS architecture may use a six-pin configuration with two pins designated for open and close, a pin designated for TPS1, a pin designated for TPS2, a pin designated for reference voltage, and a pin designated for return, or ground. Additionally, a six-pin throttle body generally permits reduced connector size and simplification of the throttle body. With less wiring from the reduced number of pins in the throttle body, reliability is improved because fewer wires are available for failure. Less wiring may also reduce the cost for the throttle body and associated wiring harness because of fewer cut wire leads. Further, for all first order failures occurring in the invented ETC system, such as a short to ground, no engine shutdown occurs.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A throttle body assembly comprising:
 a throttle actuator;
 an input circuit receiving sensor signals, said input circuit comprising:
 a first reference voltage; and
 a second reference voltage; and
 a third reference voltage;
 a first throttle position sensor (TPS) connected to said second reference voltage;
 a second TPS connected to said second reference voltage;
 a manifold absolute pressure (MAP) sensor connected to said first reference voltage;
 a manifold airflow (MAF) sensor connected to said third reference voltage; and
 a processor connected to said input circuit and transmitting a control signal to said throttle actuator based on said sensor signals.

2. A throttle body assembly according to claim 1, wherein said first reference voltage is 5 Volts, said second reference voltage is 5 Volts, and said third reference voltage is 12 Volts.

3. A throttle body assembly according to claim 1, wherein said processor is configured to compare the sensor signal from said first TPS with the sensor signal from said second TPS and determine a TPS correlation error, said processor transmitting a control signal corresponding to a higher throttle of said first TPS and said second TPS when a correlation error is determined and limiting throttle actuation.

4. A throttle body assembly according to claim 3, wherein said processor is configured to determine a TPS short between said first TPS and said second TPS.

5. A throttle body assembly according to claim 4, wherein said processor comprises a look-up table having remedial actions corresponding to failures of each of said first reference voltage, said second reference voltage, said first TPS, said second TPS, said MAP sensor, said MAF sensor, said TPS correlation error, and said TPS short.

6. A throttle body assembly according to claim 5, wherein said processor is configured to transmit a control signal corresponding to one of the remedial actions based on a first failure of one of said first reference voltage, said second reference voltage, said first TPS, said second TPS, said MAP sensor, said MAF sensor, said TPS correlation error, and said TPS short; and wherein the remedial actions comprise: a limited throttle displacement; a powered-off throttle, and no remedial action.

7. A throttle body assembly according to claim 6, wherein said processor is configured to transmit a control signal corresponding to a limited throttle displacement for a first failure of one of said first TPS, said second TPS, said first reference voltage, and said TPS correlation error; and wherein said processor is configured to transmit a control signal corresponding to powered-off throttle for a first failure of one of said second reference voltage and said TPS short.

8. A throttle body assembly according to claim 6, wherein said processor is configured to transmit a control signal corresponding to one of the remedial actions based on the first failure and a second failure of one of said first reference voltage, said second reference voltage, said first TPS, said second TPS, said MAP sensor, said MAF sensor, said TPS correlation error, and said TPS short.

9. A throttle body assembly according to claim 8, wherein for a first failure of said first TPS said processor is configured to transmit a control signal corresponding to a limited throttle displacement for a second failure of one of said MAP sensor, said MAF sensor, and said first reference voltage; and wherein for a first failure of said first TPS said processor is configured to transmit a control signal corresponding to a powered-off throttle for a second failure one of said second TPS, said second reference voltage, and said TPS short.

10. A throttle body assembly according to claim 8, wherein for a first failure of said second TPS said processor is configured to transmit a control signal corresponding to a limited throttle displacement for a second failure of one of said MAP sensor, said first reference voltage, and said MAF sensor; and wherein for a first failure of said second TPS said processor is configured to transmit a control signal corresponding to a powered-off throttle for a second failure of one of said first TPS, said second reference voltage, and said TPS short.

11. A throttle body assembly according to claim 8, wherein for a first failure of said MAP sensor said processor is configured to transmit a control signal corresponding to a limited throttle displacement for a second failure of one of said first TPS, said second TPS, said first reference voltage, and said TPS correlation error; and wherein for a first failure of said MAP sensor said processor is configured to transmit a control signal corresponding to a powered-off throttle for a second failure of one of said MAF sensor, said second reference voltage, and said TPS short.

12. A throttle body assembly according to claim 8, wherein for a first failure of said MAF sensor said processor is configured to transmit a control signal corresponding to a limited throttle displacement for a second failure of one of said first TPS, said second TPS, said first reference voltage, and said TPS correlation error; and wherein for a first failure of said MAF sensor said processor is configured to transmit a control signal corresponding to a powered-off throttle for a second failure of one of said MAP sensor, said second reference voltage, and said TPS short.

13. A throttle body assembly according to claim 8, wherein for a first failure of said first reference voltage said processor is configured to transmit a control signal corresponding to a limited throttle displacement for a second failure of one of said first TPS, said MAP sensor, and said second TPS; and wherein for a first failure of said first reference voltage said processor is configured to transmit a control signal corresponding to a powered-off throttle for a second failure of one of said second reference voltage, said MAF sensor, and said TPS short.

14. A throttle body assembly according to claim 8, wherein for a first failure of said second reference voltage said processor is configured to transmit a control signal corresponding to a powered-off throttle for a second failure of one of said MAP sensor, said MAF sensor, said first TPS, said second TPS, said first reference voltage, and said TPS short.

15. A throttle body assembly according to claim 8, wherein for a first failure of said TPS correlation error said processor is configured to transmit a control signal corresponding to a limited throttle displacement for a second failure of one of said MAP sensor, said MAF sensor, said first TPS, said second TPS, and said first reference voltage; and wherein for a first failure of said TPS correlation error said processor is configured to transmit a powered-off throttle for a second failure of one of said second reference voltage and said TPS short.

16. A communication device according to claim 8, wherein for a first failure of said TPS short said processor is configured to transmit a control signal corresponding to a powered-off throttle for a second failure of one of said MAP sensor, said MAF sensor, said first TPS, said second TPS, said first reference voltage, said second reference voltage, and said TPS correlation error.

17. A communication device for failure mode response of a throttle body assembly, said communication device comprising:
a detector circuit receiving signals from at least one of a first TPS, a second TPS, a MAP sensor, and a MAF sensor, a first reference voltage, a second reference voltage, and a third reference voltage, said detector circuit transmitting an output signal upon determination of a failure mode response corresponding to the received signals; and
a memory coupled with said detector circuit and storing a look-up table of failure mode responses selected from one of a limited throttle displacement, a powered-off throttle, and a no remedial action, the failure mode responses based on at least one of a first order failure and a second order failure of the first TPS, the second TPS, the MAP sensor, the MAF sensor, the first reference voltage, and the second reference voltage, said output signal based on said failure mode response selected from said look-up table of failure mode responses.

18. A communication device according to claim 17, wherein said look-up table of said memory comprises: a limited throttle displacement for a first order failure of the first reference voltage; a powered-off throttle for a first order failure of the second reference voltage; a no remedial action for a first order failure of the MAP sensor; and a no remedial action for a first order failure of the MAF sensor.

19. A communication device according to claim 18, wherein said detector circuit is configured to determine a TPS correlation error and a TPS short between the first TPS and the second TPS based on the signal from the first TPS and the signal from the second TPS; wherein the failure mode responses are further based on at least one of a first order failure and a second order failure of a TPS correlation error and a TPS short.

20. A communication device according to claim 19, wherein said look-up table of said memory further comprises: a limited throttle displacement for a first order failure of the first TPS; a limited throttle displacement for a first order failure of the second TPS; a limited throttle displacement for a first order failure of the TPS correlation error; and a powered-off throttle for a first order failure of the TPS short.

21. A communication device according to claim 20, wherein for the first order failure of the first TPS said look-up table of said memory further comprises: a limited throttle displacement for a second order failure of one of the MAP sensor, the MAF sensor, and the first reference voltage; and a powered-off throttle for a second order failure one of the second TPS, the second reference voltage, and the TPS short.

22. A communication device according to claim 20, wherein for the first order failure of the second TPS said look-up table of said memory further comprises: a limited throttle displacement for a second order failure of one of the MAP sensor, the first reference voltage, and the MAF sensor; and a powered-off throttle for a second order failure of one of the first TPS, the second reference voltage, and the TPS short.

23. A communication device according to claim 20, wherein for the first order failure of the MAP sensor said look-up table of said memory further comprises: a limited throttle displacement for a second order failure of one of the first TPS, the second TPS, the first reference voltage, and the TPS correlation error; and a powered-off throttle for a second order failure of one of the MAF sensor, the second reference voltage, and the TPS short.

24. A communication device according to claim 20, wherein for the first order failure of the MAF sensor said look-up table of said memory further comprises: a limited throttle displacement for a second order failure of one of the first TPS, the second TPS, the first reference voltage, and the TPS correlation error; and a powered-off throttle for a second order failure of one of the MAP sensor, the second reference voltage, and the TPS short.

25. A communication device according to claim 20, wherein for the first order failure of the first reference voltage said look-up table of said memory further comprises: a limited throttle displacement for a second order failure of one of the MAP sensor, the first TPS, and the second TPS; and a powered-off throttle for a second order failure of one of the second reference voltage, the MAF sensor, and the TPS short.

26. A communication device according to claim 20, wherein for the first order failure of the second reference voltage said look-up table of said memory further comprises a powered-off throttle for a second order failure of one of the MAP sensor, the MAF sensor, the first TPS, the second TPS, the first reference voltage, and the TPS short.

27. A communication device according to claim 20, wherein for the first order failure of the TPS correlation error said look-up table of said memory further comprises: a limited throttle displacement for a second order failure of one of the MAP sensor, the MAF sensor, the first TPS, the second TPS, and the first reference voltage; and a powered-off throttle for a second order failure of one of the second reference voltage and the TPS short.

28. A communication device according to claim 20, wherein for the first order failure of the TPS short said look-up table of said memory further comprises a powered-off throttle for a second order failure of one of the MAP sensor, the MAF sensor, the first TPS, the second TPS, the first reference voltage, the second reference voltage, and the TPS correlation error.

29. In an electronic throttle control system, a method of failure mode response comprising the steps of:
  detecting a first failure from one of a first TPS, a second TPS, a MAP sensor, a MAF sensor, a first reference voltage, a second reference voltage, a TPS correlation error, and a TPS short;
  in response to the detected first failure performing one of limiting throttle displacement, powering-off throttle, and no remedial action from a look-up table of failure mode responses;
  detecting a second failure from one of the first TPS, the second TPS, the MAP sensor, the MAF sensor, the first reference voltage, the second reference voltage, the TPS correlation error, and the TPS short; and
  in response to the detected second failure performing one of limiting throttle displacement, powering-off throttle, and no remedial action from the look-up table of failure mode responses.

30. A method according to claim 29, wherein said step of performing in response to the detected first failure comprises the steps of:
  limiting throttle displacement in response to a detected first failure of the first reference voltage;
  powering-off throttle in response to a detected first failure of the second reference voltage;
  performing no remedial action in response to a detected first failure of the MAP sensor; and
  performing no remedial action in response to a detected first failure of the MAF sensor.

* * * * *